(12) United States Patent
Eriksen et al.

(10) Patent No.: US 8,933,713 B2
(45) Date of Patent: Jan. 13, 2015

(54) CAPACITIVE SENSORS FOR MONITORING LOADS

(75) Inventors: Odd Harald Steen Eriksen, Minneapolis, MN (US); Christopher Sanden, Bloomington, MN (US)

(73) Assignee: Goodrich Corporation, Charlotte, NC (US)

( * ) Notice: Subject to any disclaimer, the term of this patent is extended or adjusted under 35 U.S.C. 154(b) by 493 days.

(21) Appl. No.: 13/272,317

(22) Filed: Oct. 13, 2011

(65) Prior Publication Data

US 2012/0043417 A1  Feb. 23, 2012

Related U.S. Application Data

(63) Continuation-in-part of application No. 12/857,793, filed on Aug. 17, 2010, now Pat. No. 8,659,307.

(60) Provisional application No. 61/393,456, filed on Oct. 15, 2010.

(51) Int. Cl.
*G01R 27/26* (2006.01)
*G01L 5/00* (2006.01)
(Continued)

(52) U.S. Cl.
CPC .............. *B64C 25/001* (2013.01); *G01L 5/0014* (2013.01); *B64D 2045/008* (2013.01); *B64C 2025/006* (2013.01); *G01L 1/142* (2013.01)
USPC ........................................................ 324/686

(58) Field of Classification Search
CPC  B64D 2045/008; B64C 25/001; G01L 1/142; G01L 1/144; G01L 5/0014

USPC ................................. 324/690, 658–661, 686; 244/100 R–100 A, 102 SL, 102 SS

See application file for complete search history.

(56) References Cited

U.S. PATENT DOCUMENTS 2,968,031 A  1/1961 Higa
3,783,496 A  1/1974 Siler
(Continued)

FOREIGN PATENT DOCUMENTS

DE  3239877 A1  5/1984
DE  4035197 A1  1/1992
(Continued)

OTHER PUBLICATIONS

PEPPERL+FUCHS, Mounting Accessories, Aug. 7, 2008, pp. 1-2.*
(Continued)

*Primary Examiner* — Patrick Assouad
*Assistant Examiner* — Demetrius Pretlow
(74) *Attorney, Agent, or Firm* — Snell & Wilmer L.L.P.

(57) ABSTRACT

A sensor for monitoring loads in a landing gear torque linkage includes a main pin having an axial interior bore defined therein. The main pin is configured and adapted to engage a torque link to a strut lug of a landing gear strut. A core pin is mounted axially within an interior bore of the main pin and is spaced radially inwardly from the interior bore for relative displacement with respect to the main pin. A capacitor is included having an inner capacitor plate mounted to the core pin. An outer capacitor plate is mounted to the main pin. Relative displacement of the core pin and the main pin due to loads acting on the torque link and strut lug results in relative displacement of the inner and outer capacitor plates. Signals can thereby be produced indicative of the loads acting on the torque link.

8 Claims, 5 Drawing Sheets

(51) Int. Cl.
*B64C 25/00* (2006.01)
*G01L 1/14* (2006.01)
*B64D 45/00* (2006.01)

(56) References Cited

U.S. PATENT DOCUMENTS

| | | | |
|---|---|---|---|
| 3,995,696 A * | 12/1976 | Kainer et al. | 172/7 |
| 4,269,070 A | 5/1981 | Nelson et al. | |
| 4,312,042 A | 1/1982 | Bateman | |
| 4,384,496 A * | 5/1983 | Gladwin | 73/862.626 |
| 4,386,386 A * | 5/1983 | Akita | 361/283.1 |
| 4,386,533 A * | 6/1983 | Jackson et al. | 73/862.626 |
| 4,480,480 A | 11/1984 | Scott et al. | |
| 4,651,402 A | 3/1987 | Bonfils | |
| 4,850,552 A | 7/1989 | Darden et al. | |
| 5,010,775 A * | 4/1991 | Choisnet | 73/862.337 |
| 5,205,514 A | 4/1993 | Patzig et al. | |
| 5,314,115 A | 5/1994 | Moucessian | |
| 5,358,637 A | 10/1994 | Hutzler et al. | |
| 5,446,666 A | 8/1995 | Bauer | |
| 5,477,740 A | 12/1995 | Shioya et al. | |
| 5,518,206 A | 5/1996 | Arnold et al. | |
| 5,815,091 A | 9/1998 | Dames et al. | |
| 6,279,407 B1 * | 8/2001 | Park et al. | 73/862.391 |
| 6,289,289 B1 | 9/2001 | Zweifel | |
| 6,334,588 B1 | 1/2002 | Porte | |
| 6,354,152 B1 | 3/2002 | Herlik | |
| 6,676,075 B2 | 1/2004 | Cowan et al. | |
| 6,745,153 B2 | 6/2004 | White et al. | |
| 6,880,784 B1 | 4/2005 | Wilkinson et al. | |
| 6,902,136 B2 | 6/2005 | Mackness | |
| 6,951,145 B2 | 10/2005 | Kilmartin | |
| 6,959,497 B2 | 11/2005 | Leidinger | |
| 7,208,945 B2 | 4/2007 | Jones et al. | |
| 7,589,645 B2 | 9/2009 | Schmidt | |
| 7,680,630 B2 | 3/2010 | Schmidt | |
| 7,843,363 B2 | 11/2010 | Grichener et al. | |
| 2001/0026163 A1 * | 10/2001 | Sasaki et al. | 324/690 |
| 2002/0199131 A1 | 12/2002 | Kocin | |
| 2003/0209063 A1 | 11/2003 | Adamson et al. | |
| 2004/0011596 A1 | 1/2004 | Miller et al. | |
| 2004/0012212 A1 | 1/2004 | Pratt et al. | |
| 2004/0075022 A1 | 4/2004 | MacKness | |
| 2004/0102918 A1 | 5/2004 | Stana | |
| 2004/0129834 A1 | 7/2004 | Luce | |
| 2004/0225474 A1 | 11/2004 | Goldfine et al. | |
| 2005/0030010 A1 | 2/2005 | Jones et al. | |
| 2006/0004499 A1 | 1/2006 | Trego et al. | |
| 2006/0038410 A1 | 2/2006 | Pratt et al. | |
| 2007/0006662 A1 | 1/2007 | Giazotto | |
| 2009/0173823 A1 | 7/2009 | Shetzer | |
| 2010/0162864 A1 * | 7/2010 | Kozasa et al. | 83/23 |
| 2010/0288878 A1 * | 11/2010 | Bennett | 244/104 FP |
| 2012/0011946 A1 | 1/2012 | Eriksen et al. | |
| 2012/0012700 A1 | 1/2012 | Eriksen et al. | |
| 2012/0012701 A1 | 1/2012 | Eriksen et al. | |
| 2012/0053784 A1 | 3/2012 | Schmidt et al. | |

FOREIGN PATENT DOCUMENTS

| | | |
|---|---|---|
| EP | 0072634 A1 | 2/1983 |
| EP | 1839984 A1 | 10/2007 |
| GB | 2226416 A | 6/1990 |
| SU | 1469339 A1 | 3/1989 |
| WO | WO-0212043 A1 | 2/2002 |
| WO | WO-2004013785 A2 | 2/2004 |
| WO | WO-2006067442 A1 | 6/2006 |

OTHER PUBLICATIONS

Extended Search Report issued Feb. 8, 2012 in connection with EP Application No. 11250852.8.

Extended Search Report issued Feb. 4, 2010 in connection with European Patent Application No. 05808070.6.

Office Action issued Feb. 3, 2012 in connection with U.S. Appl. No. 13/271,468.

Partial Search Report issued Nov. 2, 2011 in connection with European Patent Application No. 11250645.6.

Office Action issued Mar. 19, 2012 in connection with U.S. Appl. No. 12/839,401.

Extended Search Report issued Mar. 15, 2012 in connection with European Patent Application No. 11250645.6.

Partial Search Report issued Nov. 2, 2011 in connection with European Patent Application No. 11250647.2.

Extended Search Report issued Mar. 15, 2012 in connection with European Patent Application No. 11250647.2.

First Action Pre-Interview Communication issued May 30, 2012 in connection with U.S. Appl. No. 12/839,216.

* cited by examiner

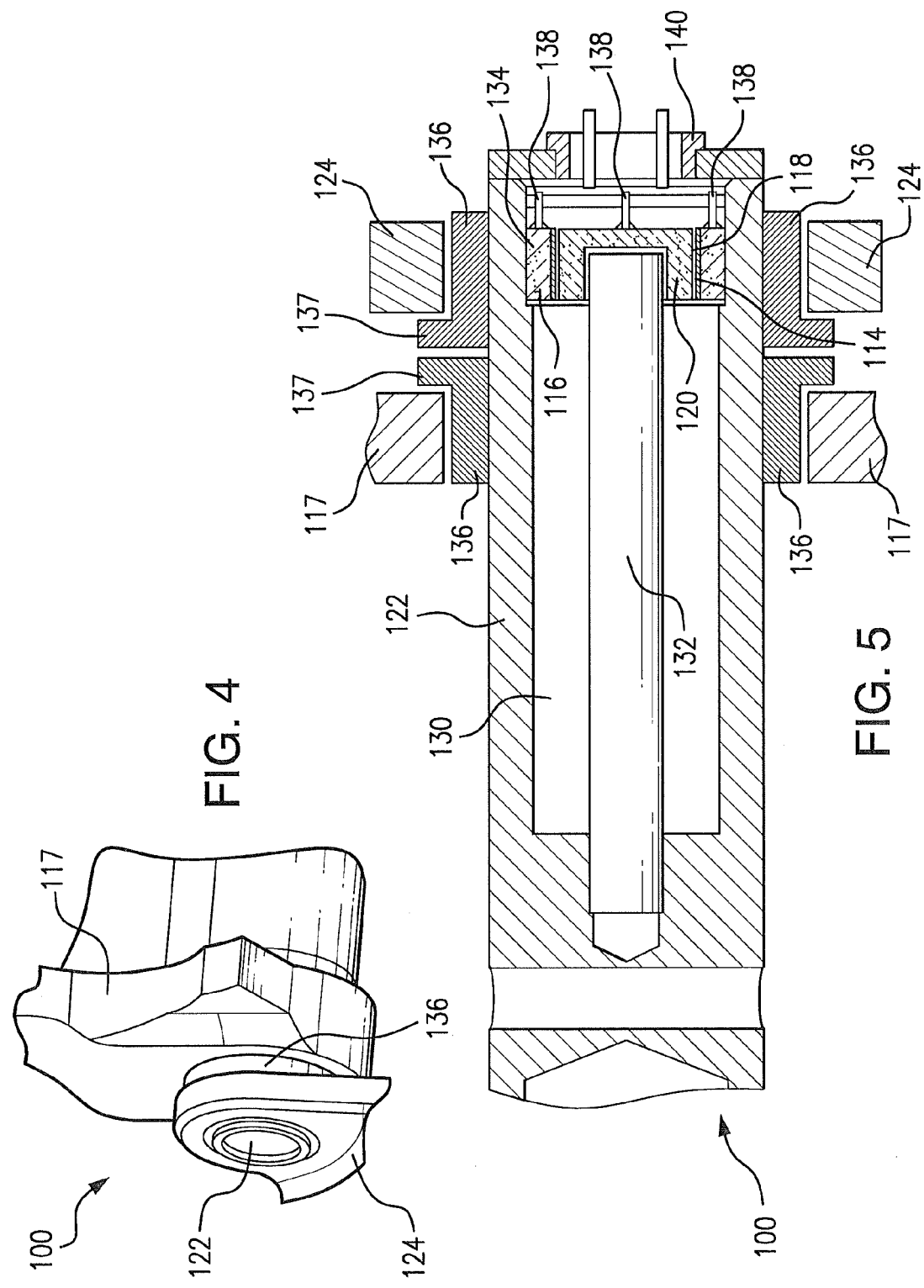

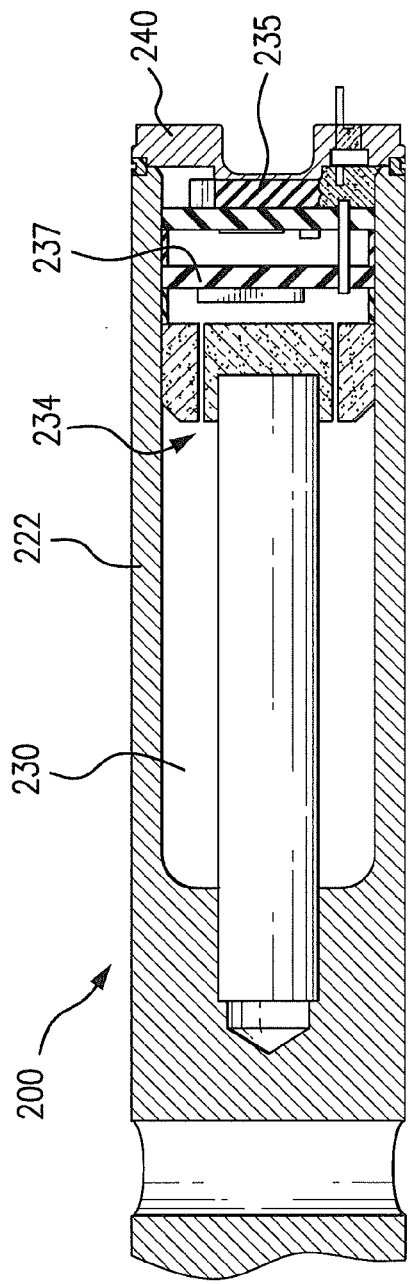
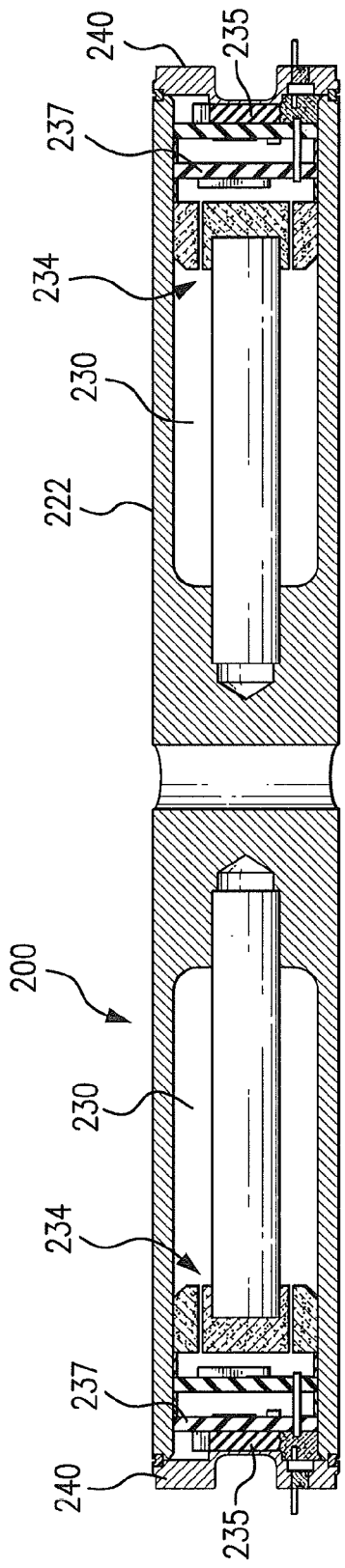
FIG. 8
FIG. 9

US 8,933,713 B2

CAPACITIVE SENSORS FOR MONITORING LOADS

CROSS-REFERENCE TO RELATED APPLICATIONS

This application is a continuation-in-part of U.S. patent application Ser. No. 12/857,793 filed Aug. 17, 2010. This application claims benefit of priority to U.S. Provisional Patent Application No. 61/393,456 filed Oct. 15, 2010. Reference is also made herein to U.S. patent application Ser. No. 12/839,401 filed Jul. 19, 2010, to U.S. patent application Ser. No. 12/839,216 filed Jul. 19, 2010, and to U.S. patent application Ser. No. 12/839,170 filed Jul. 19, 2010. Each of the applications above is incorporated by reference herein in its entirety.

BACKGROUND OF THE INVENTION

1. Field of the Invention

The present invention relates to monitoring loads in load bearing members, and more particularly to sensors for monitoring loads in landing gear torque links.

2. Description of Related Art

There is a need to monitor loading in landing gear structures of aircraft to determine if the load bearing members are ever overloaded. The application of a landing gear overload detection system to an aircraft landing gear requires measurement of loading in six dimensions or degrees of freedom, namely three linear dimensions and three rotational dimensions. These six dimensions or degrees of freedom are identified in FIG. 1. One particular loading dimension of interest is rotation about the main axis of the landing gear strut (MV in FIG. 1), where there is a rotational moment applied to the strut from the action of the wheels on the ground. A torque linkage is typically provided to bear this rotational moment, preventing rotation between telescoping strut members, and measurement of the resulting moment can be accomplished in a number of ways. In the laboratory, a foil strain gage can be bonded to the strut piston in a position advantageous to monitoring pure shear due to torsion. Foil strain gages, however, are not reliable over the long term, so other means have been devised to measure the applied rotational moment.

One approach to this problem has been to mount a linear capacitive sensor capsule to one of the torque links. The torsional loading on the torque link puts the web of the torque link in tension. The resultant linear strain on the link can be measured in a linear capacitive sensor capsule by monitoring the change in capacitance as the capacitor plates are moved away from or toward each other under the strain motion in the torque link. Such sensors have typically been sensitive and accurate. In some applications, the most desirable location for this type of sensor with respect to sensitivity, is unfavorable with respect to exposure to the elements and to the hazards of flying debris. Positive fixation, e.g., by fasteners, when mounting such sensors may not be practical in applications where it is preferred not to form holes in the loaded elements. In such applications, sensors of this type are typically mounted in place by an adhesive bond that is not as robust as positive fixation by typical fasteners.

Such conventional methods and systems have generally been considered satisfactory for their intended purpose. However, there is still a need in the art for capacitive sensors that allow for sensitive and accurate monitoring of loads while being robust under exposure to the elements and/or flying debris as in landing gear applications, for example. There also remains a need in the art for such sensors that are easy to make and use. The present invention provides a solution for these problems.

SUMMARY OF THE INVENTION

The subject invention is directed to new and useful systems and methods for monitoring loads in landing gear structures. In accordance with an exemplary embodiment, a sensor for monitoring loads in a landing gear torque linkage or assembly includes a main pin having an axial interior bore defined therein and a length defined from a first end to an opposed second end thereof. The main pin is configured and adapted to engage a torque link to a strut lug of a landing gear strut. A core pin is mounted axially aligned within the interior bore of the main pin and is spaced radially inwardly with a radial clearance from the interior bore for relative displacement with respect to the main pin.

A capacitor has an inner capacitor plate mounted to the core pin and an outer capacitor plate mounted to the main pin. Relative displacement of the core pin and the main pin due to external loading on the main pin, e.g., from the torque link and strut lug, results in relative displacement of the inner and outer capacitor plates. The capacitor is configured and adapted to be connected to an electrical circuit to produce signals indicative of the loads acting on the torque link and strut lug based on changes in capacitance due to relative displacement of the inner and outer capacitor plates. A transmitter may be electrically connected to the electrical circuit to transmit the signals indicative of external loading on the main pin.

The interior bore can extend along about half of the length of the main pin, or any other suitable portion of the length. The core pin can therefore be cantilevered to the interior bore proximate a middle portion of the main pin. The capacitor can be located proximate the second, or free end of the main pin. It is also contemplated that the interior bore can extend through the entire length of the main pin, wherein the core pin is mounted to the interior bore proximate the first end of the main pin, and wherein the capacitor is located proximate the second end of the main pin. An electronics housing can be included on an end of the main pin proximate the capacitor for holding electronic components in electrical communication with the capacitor, for example if the added volume is needed. The electronics housing can be axially eccentric or concentric with respect to the axial interior bore of the main pin. It is also contemplated that the main pin can include an angle sensor for monitoring change in the relative angle between the strut lug and the torque link. The angle sensor can be mounted in an end of the main pin opposite the end with the capacitor or can be included in the load sensing end, for example if the electronics are recessed enough into the main pin to provide adequate volume for the angle sensor as well. An angle sensor can be mounted, for example, in the axial interior bore of the main pin between the capacitor and the first end of the main pin. The core pin, capacitor, and angle sensor can be mounted proximate the first end of the main pin. A second such core pin, capacitor, and angle sensor can be mounted proximate the second end of the main pin for increased reliability and accuracy.

In certain embodiments, one or more additional outer capacitor plates can be included, each being mounted to the main pin. The outer capacitor plates can each be substantially aligned circumferentially and axially with the inner capacitor plate. Each of the outer capacitor plates can be configured and adapted to be connected to an electrical circuit to produce signals indicative of external loading on the main pin as described above. The outer capacitor plates can be spaced apart substantially evenly circumferentially. With three or more outer capacitor plates, signals indicative of load magnitude and applied angle can be produced. Signals from opposed outer capacitor plates can be constructively combined, wherein the signals are read differentially to increase signal strength for added sensitivity and accuracy.

It is contemplated that the outer capacitor plate can be substantially semi-cylindrical in cross-section and can be substantially aligned axially with the inner capacitor plate. The core pin can be metallic and can be mounted to the axial interior bore of the main pin with a press fit. A ceramic ring can be mounted to the main pin, wherein the outer capacitor plate or plates are mounted to the ceramic ring.

The system can further include a hermetic bulkhead in the interior bore of the main pin sealing the electrical circuit and capacitor within the interior bore. A battery can be electrically connected to the electrical circuit to provide power thereto. It is contemplated that the transmitter can be a wireless transmitter, or can be configured to transmit over one or more wires. If a wire transmitter is included, a wire connector can be electrically connected to the electrical circuit through the bulkhead to provide power thereto from an external power source. In the case of a wireless transmitter being used, the transmitter can be configured for radio frequency, infrared, or any other suitable mode of wireless transmission.

The invention also includes a sensor assembly for monitoring loads acting on a load bearing member. The sensor assembly includes a first mount body having a bore therethrough. A second mount body has a bore therethrough substantially coaxial with the bore of the first mount body. A main pin, core pin, and capacitor as described above are included, with the main pin extending through the bores of the first and second mount bodies. Relative displacement of the core pin and the main pin due to external loading on the first and second mount bodies results in relative displacement of the inner and outer capacitor plates. The capacitor is configured and adapted to be connected to an electrical circuit to produce signals as described above. It is contemplated that the sensor assembly can be configured to monitor pure shear between the first and second mount body, to monitor overhanging loads on the main pin, and/or any other suitable type of load.

In certain embodiments, a pair of opposed bushings is disposed about the main pin. Each bushing has a rim extending into a space between the first and second mount bodies. The capacitor plates can be positioned axially proximate a joint between the first and second mount bodies, and proximate the joint between the bushings.

The invention also includes a torque linkage for bearing and monitoring rotational moments in a landing gear strut. The torque linkage includes a main pin, as described above, engaging a torque link to a strut lug. The torque link is configured and adapted to bear rotational moments about a lengthwise axis of the landing gear strut. A core pin and capacitor as described above are mounted to the main pin.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 4 is a perspective view of a portion of an exemplary embodiment of a landing gear assembly constructed in accordance with the present invention, showing a torque link pinned to a strut lug with a pin having a capacitive sensor for monitoring loads or strain in the torque link;

FIG. 5 is a partial cross-sectional view toward the axis of the pin portion of the landing gear assembly of FIG. 4, showing the capacitor within the main pin;

FIG. 8 is a partial cross-sectional view toward the pin axis of another exemplary embodiment of a sensor constructed in accordance with the present invention, showing an angle sensor between the capacitor and first end of the main pin; and FIG. 9 is a cross-sectional view toward the pin axis of the sensor of FIG. 8, showing a second capacitor and angle sensor in the second end of the main pin opposite those of the first end.

DETAILED DESCRIPTION OF THE PREFERRED EMBODIMENTS

Figure 1:
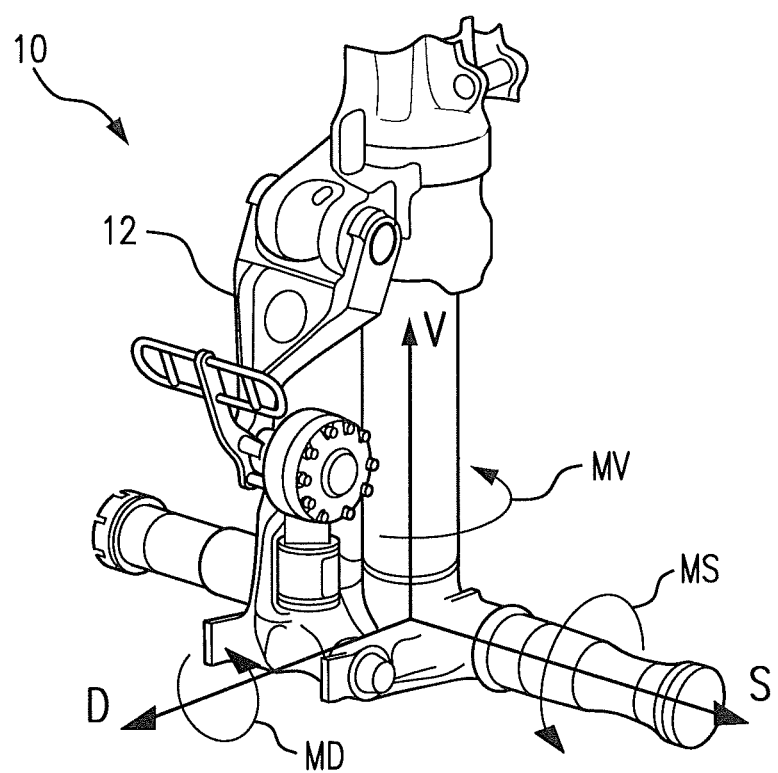
FIG. 1 is a perspective view of an exemplary landing gear strut showing the six degrees of freedom for loads acting on the strut.

Reference will now be made to the drawings wherein like reference numerals identify similar structural features or aspects of the subject invention. For purposes of explanation and illustration, and not limitation, a partial view of an exemplary embodiment of a sensor which has been constructed in accordance with the invention is shown in FIG. 4 and is designated generally by reference character 100. Other embodiments of sensors in accordance with the invention, or aspects thereof, are provided in FIGS. 5-9, as will be described. The systems and methods of the invention can be used, for example, to monitor loads acting on landing gear structures, such as struts.

With reference now to FIG. 1, there is a need to monitor linear loads and rotational moments in aircraft landing gear structures. The complete application of an overload detection system to a landing gear structure requires measurement of loading in six dimensions, or degrees of freedom. An exemplary landing gear strut 10 is shown in FIG. 1, with these six degrees of freedom indicated, wherein MS is braking torque and the like, MD is torque from ground slope, tilted landing, lateral acceleration, turning, cross-wind landing, and the like, MV is variable brake loading and the like, S is linear loading due to the same type of causes as MD or by side loading, D is linear loading due to braking and the like, and V is loading due to aircraft weight on the wheels, landing load, and the like.

Figure 2:
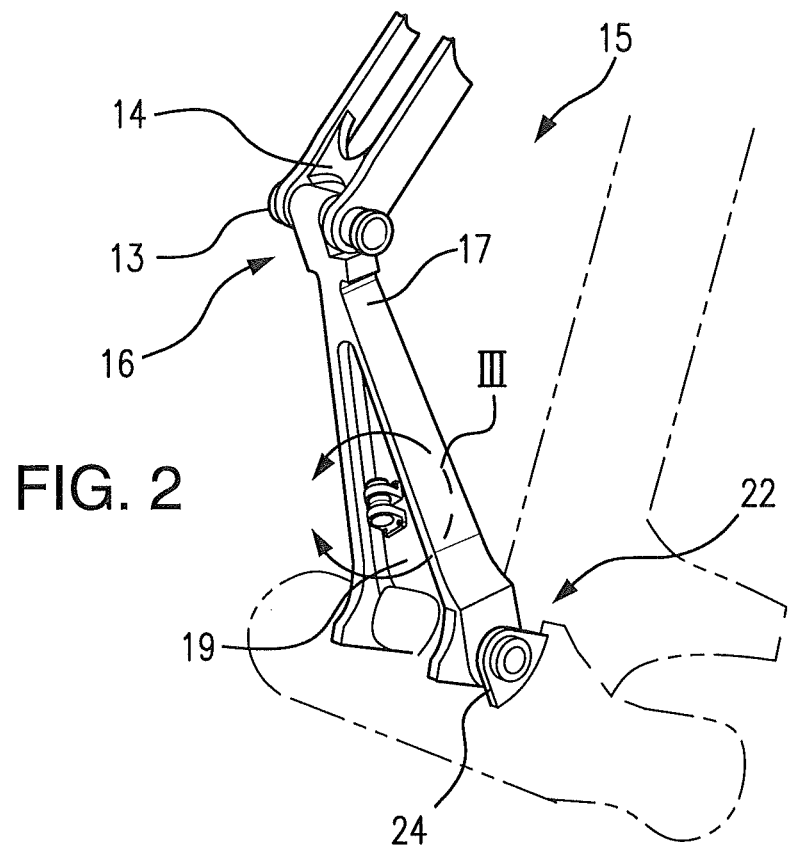
FIG. 2 is a perspective view of a portion of a landing gear strut and torque linkage, showing a location for monitoring loads in the lower torque link.

Of particular interest for monitoring loads on the torque linkage associated with the landing gear is MV, which is rotational moment or torque about the lengthwise axis of the strut. Referring now to FIG. 2, another exemplary landing gear strut 15 is shown with its respective torque linkage 16. Torque linkage 16 includes an upper torque link 14 and lower torque link 17 that are pinned together by an apex pin 13. Upper and lower torque links 14 and 17 are pinned to lugs 24 of telescoping strut members by upper and lower pins 22 so torque linkage 16 can bear MV loads in landing gear strut 15. In FIG. 2, only the lower pin 22 and lug 24 are shown, but see FIG. 1, where the upper strut lug and pin for a similar torque linkage 12 are shown.

Figure 3:
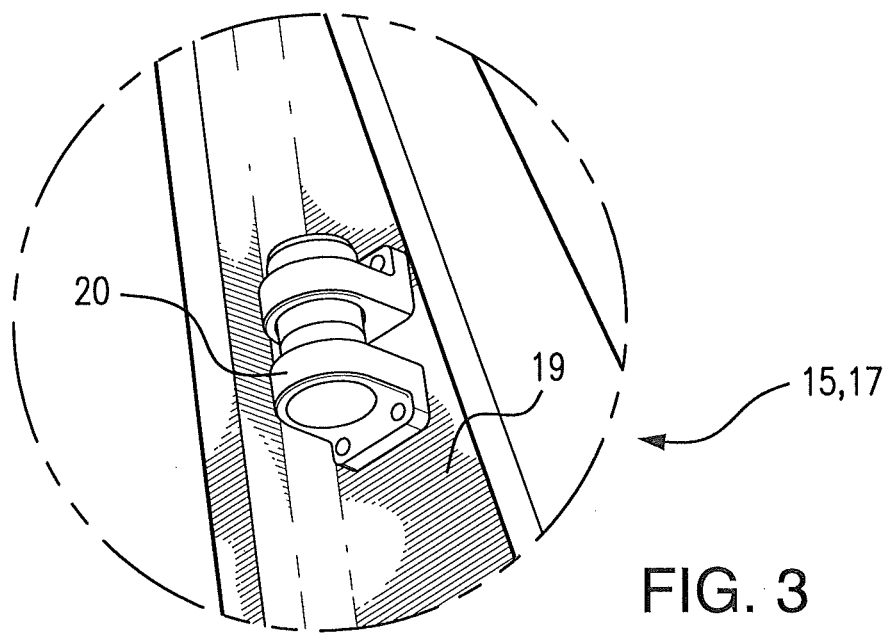
FIG. 3 is a perspective view of a web portion of a landing gear torque link, showing a linear, capacitive strain sensor capsule mounted thereto.

The circled area indicated in FIG. 2 includes web 19 of lower torque link 17. When rotational loads, e.g., MV loads, act on strut 15, these loads are taken up by torque link 17 and web 19 is placed in tension and undergoes strain in orientations determined by the shape of the link. U.S. patent application Ser. No. 12/839,401 discloses a capacitive sensor 20 that can be mounted to web 19 to monitor MV loading in torque link 17, as shown in FIG. 3. The capacitive sensor 20 is mounted such that it is axially aligned with the principal planar strain in the web. As strain develops in web 19, two plates of a capacitor associated with sensor 20 are displaced relative to one another causing sensor 20 to produce a signal indicative of MV loading on torque link 17. The force inducing this linear strain in torque link 17 is the result of the torque reaction load taken in pins 22 connecting torque link 17 to strut 15.

With reference now to FIG. 4, sensor 100 is provided to monitor the loads on torque link 117 by directly detecting mechanical strain in pin 122. Pin 122 couples torque link 117 to strut lug 124, which is part of the strut structure. Therefore, when torque link 117 bears rotational loads transferred from the strut by way of strut lug 124, as described above, a mechanical strain is imparted on pin 122. As shown in FIG. 5, a pair of opposed bushings 136 is disposed about pin 122, one between pin 122 and torque link 117, and the other between pin 122 and strut lug 124. Each bushing 136 has a rim 137 extending into the space between torque link 117 and strut lug 124. Similar bushings can be included at the opposite end of pin 122, which runs through opposite flanges of the torque link 117 and strut lug 124. The resultant loading on pin 122 is in shear proximate each end thereof due to the tension between torque link 117 and strut lug 124. There is also a bending aspect to the load on pin 122, as described in U.S. patent application Ser. No. 12/857,793.

Referring now to FIG. 5, pin 122 includes an axial internal bore 130 that separates the main pin from core pin 132. Core pin 132 is mounted axially within the bore 130 of pin 122 and is spaced radially inwardly from the wall of bore 130 for relative displacement with respect to the main pin when pin 122 undergoes deformation under external loads. A capacitor 134 is mounted at the free end of core pin 132 for detecting the relative displacement just described.

Figure 6:
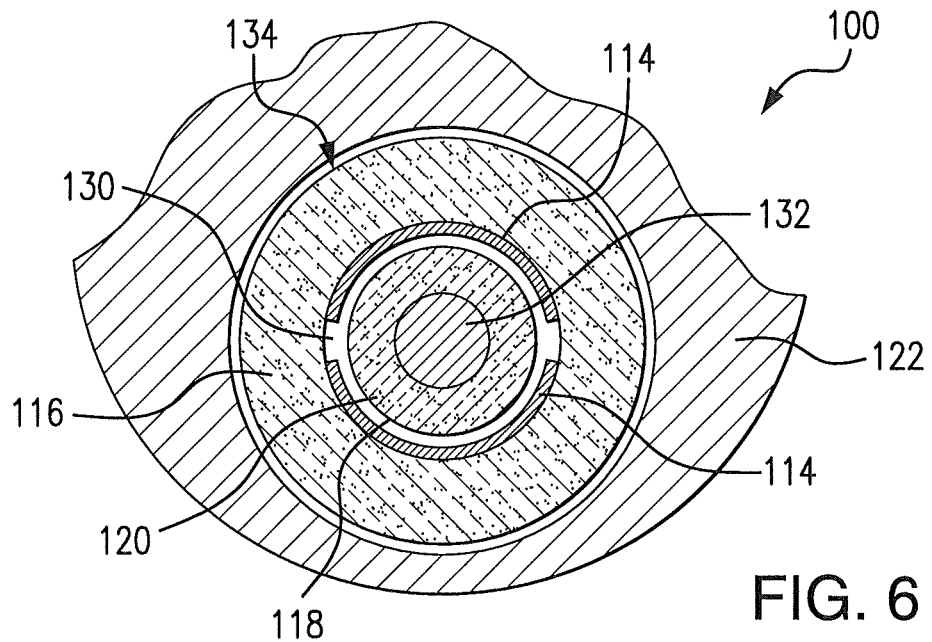
FIG. 6 is a cross-sectional end view of the capacitor of FIG. 5, showing the position of the capacitor plates in a no load condition.

With reference now to FIG. 6, capacitor 134 is described in further detail. Two opposed and electrically separated outer capacitor plates 114 are mounted to pin 122 by way of capacitor ring 116. Outer capacitor plates 114 have cross-sections that are substantially semi-cylindrical, or in other words substantially semi-annular, as shown in FIG. 6. A capacitor core 120 is mounted to the free end of core pin 132. The radially outer surface of the capacitor core 120 is metallic, or otherwise electrically conductive, and forms an inner capacitor plate 118. Outer capacitor plates 114 and inner capacitor plate 118 are substantially aligned in the axial direction of pin 122, as shown in FIG. 5.

Those skilled in the art will readily appreciate that ring 116 and capacitor core 120 are advantageous because they facilitate construction of capacitor 134, as described in U.S. patent application Ser. No. 12/857,793. In installing capacitor ring 116, it important to maintain a minimum gap 130 all around capacitor core 120. For example, a suitable size range for gap 130 includes about 0.005 inches to about 0.010 inches. The gap width can be controlled during installation using a shim of appropriate thickness, for example, which can be inserted between capacitor core 120 and capacitor ring 116 while curing epoxy to mount both in place.

Figure 7:
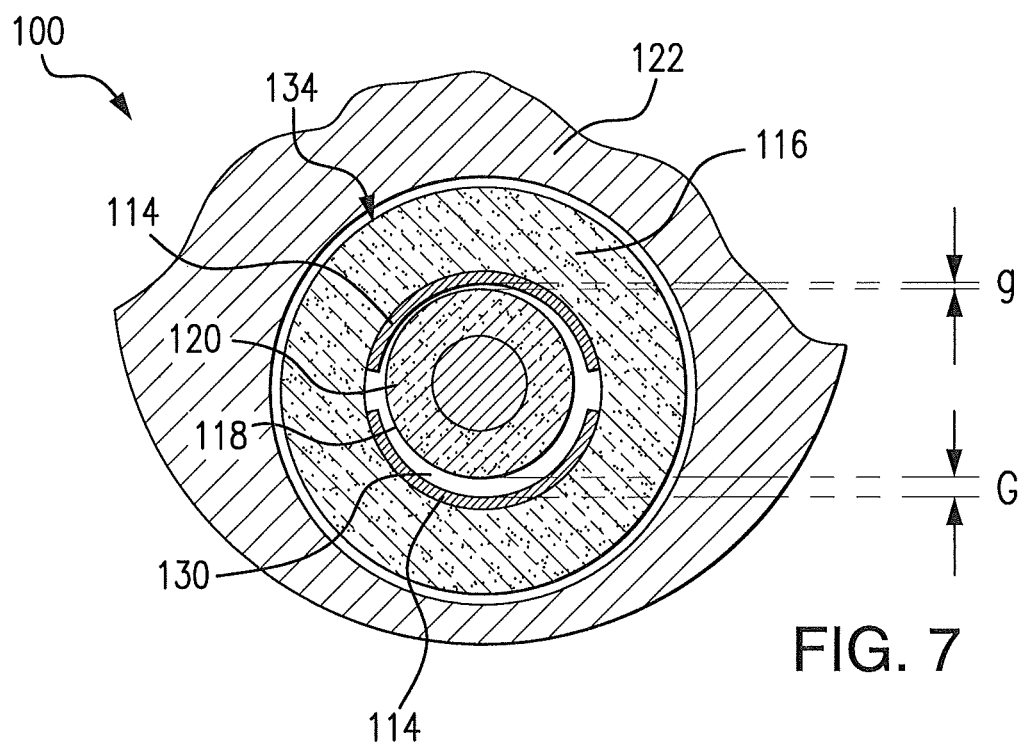
FIG. 7 is a cross-sectional end view of the capacitor of FIG. 6, showing the position of the capacitor plates when the main pin is subject to an external load.

Relative displacement of core pin 132 and pin 122 due to loads acting on torque link 117 and strut lug 124 results in relative displacement of the inner and outer capacitor plates 114, 118. The capacitor plates 114, 118 are positioned axially proximate the joint between torque link 117 and strut lug 124, and proximate the joint between bushings 136, shown in FIG. 5. Shear loading of bushings 136 distorts pin 122 causing some deflection or relative movement between ring 116 and capacitor core 120. In FIG. 6, gap 130 between inner capacitor plate 118 and outer capacitor plates 114 is substantially uniform around the circumference of capacitor 134, as when there is no load acting on pin 122. FIG. 7 shows the relative positions of capacitor plates 114, 118 when there is a load acting on pin 122. The separation g between the first outer capacitor plate 114 and inner capacitor plate 118 is smaller while the separation G between the second outer capacitor plate 114 and inner capacitor plate 118 is larger.

While use of a single outer capacitor plate is possible, e.g., a single semi-cylindrical plate, having two opposed semi-cylindrical outer capacitor plates is advantageous because signals from opposed outer capacitor plates can be combined differentially to increase signal strength and gain sensitivity, as described in U.S. patent application Ser. No. 12/857,793. The single signal from the single semi-cylindrical capacitor plate can be read by a capacitance to voltage converter chip, for example. The combined signals of opposed semi-cylindrical capacitor plates can also be read differentially by a capacitance to voltage converter chip. Also, while shown and described herein with gap 130 uniform or symmetrical in the no load condition, those skilled in the art will readily appreciate that this is exemplary only. Gap 130 could be configured to be off-set in the no load condition, with proper calibration, for example, without departing from the spirit and scope of the invention.

During assembly and in general, orientation of the pin in the bushings can be controlled to maintain plates 114 in alignment with the load direction to maintain good signal strength. Signal strength can be diminished, for example, if plates 114 are oriented 90° from what is shown in FIG. 7. An exemplary sensor has a 3 lbs/degree deviation over a range of ±10 degrees rotation of the pin about its main axis. One way to maintain ideal alignment is by using a keying feature to prevent excessive rotation of the pin during assembly. Another approach that avoids the need for a keying feature is to use three or more outer capacitor plates, as described in U.S. patent application Ser. No. 12/857,793, in which case signal strength is maintained regardless of orientation of the pin. A keying feature plus use of a three or more outer capacitor plate configuration would allow monitoring load orientation by calculating the displacement vector in addition to load magnitude.

Referring again to FIG. 5, capacitor 134 is configured and adapted to be connected to an electrical circuit to produce signals indicative of the loads acting on torque link 117 and strut lug 124 based on the relative displacement of the inner and outer capacitor plates 114, 118. Leads 138 in the form of pins electrically connect the plates of capacitor 134 to a wire connector 140, which can be connected to circuitry external to pin 122 for monitoring loads on torque link 117. Connector 140 forms part of an electrical housing and serves as an electrical feed-through closing the housing hermetically by welding or the like. Leads 138 can be brazed into place or can be epoxied to the respective conductive surface using conductive epoxy. It is also contemplated that sensor 100 can include an electronics housing with onboard circuitry, such as one or more ASICs, with a wired and/or wireless transmitter for conveying signals out of pin 122, as described in U.S. patent application Ser. No. 12/857,793. A more temporary seal than welding can be used for the electrical housing if a wireless sensor is used where a battery must be replaced periodically, for example.

With continued reference to FIG. 5, interior bore 130 extends along about half of the length of pin 122. Core pin 132 is cantilever mounted to the inner end of interior bore 130 proximate a middle portion of pin 122. Those skilled in the art will readily appreciate that core pin 132 can be mounted at any suitable point along the length of pin 122, including the end of pin 122 opposite capacitor 134, without departing from the spirit and scope of the invention. Having core pin 132 extend only about half way through pin 122 is advantageous, because it allows room for other sensors in pin 122, for example. It is contemplated that the main pin can include a second sensor in the opposite end from capacitor 134. For example, an angle sensor for monitoring the relative angle between strut lug 124 and torque link 117 can be included in the end of pin 122 opposite the end with capacitor 134. Exemplary angle sensors for use in pin 122 are described in U.S. patent application Ser. No. 12/839,216.

Since sensor 100 is configured in the form of a pin 122 for engaging strut lug 124 to torque link 117, sensor 100 is protected by the surrounding structures and there is little or no harmful exposure of sensor 100 to the elements or flying debris. Sensor 100 can simply replace the standard pin in this position. It is also not necessary to form mounting holes in the web of torque link 117 or other load bearing members, since pin 122 fits into bores already present in existing landing gear designs. While described herein as pinning the lower strut lug to a lower torque link, those skilled in the art will readily appreciate that a sensor as described herein could also be used to engage the upper strut lug to the upper torque link, or in any other suitable location, without departing from the spirit and scope of the invention.

Suitable materials for construction of the main portion of pin 122 include medium carbon alloys of steel. 4340 steel, for example, can be heat treated to 250,000 psi tensile strength. One exemplary alloy that is advantageous is 300M, which is a modified 4340 steel that has a tensile strength of 290,000 psi. Other suitable heat treatable alloys can also be used or any other material of sufficient strength. For example, while carbon steels may require a protective coating such as hard chrome electroplating, it may be desired to use a corrosion resistant material such as 17-4 ph stainless steel and the like. Core pin 132 can be made of a hardened steel dowel pin, for example, which is press fit into pin 122. Capacitor ring 116 and capacitor core 120 can be of any suitable dielectric material such as plastic, ceramic, and the like. Ceramic is advantageous as it can be metalized and has good strength and stability over the full temperature range of interest. Further, a medium alumina such as 95% alumina has a thermal expansion coefficient close to that of carbon steel. Ceramic components can be metalized and brazed into place if desired. Furthermore, the ceramic ring could be brazed into a metallic interposer ring which ring could be welded to an appropriate interior feature of pin 122. It is advantageous for many suitable electronics for this application that all capacitance elements be "floating" electrically. While the materials above have been provided as examples, those skilled in the art will readily appreciate that any other suitable materials can be used without departing from the spirit and scope of the invention.

Sensors like sensor 100 can be configured to measure loading of the linkage system up to 50,000 in-lbs in torque, for example, or any torque for which the linkage has been appropriately designed, but testing has also shown that this type of sensor can be sensitive enough to generate a signal even under forces as small as those generated by hand.

Referring now to FIG. 8, another exemplary embodiment of a sensor 200 is shown which includes angle sensors. Sensor 200 includes main pin 222 and capacitor 234 much as described above. A Hall effect type angle sensor 235 is included within bore 230, as are the accompanying on board electronics 237 for capacitor 234. Cap 240 seals the components within bore 230 and serves as an electrical connector much as described above. As shown in FIG. 9, pin 200 includes an angle sensor 235 and capacitor 234 at each end thereof, which can be advantageous for increasing reliability and accuracy as well as providing redundancy. It is contemplated that if the bore of the main pin cannot be sized to accommodate all of the desired components, e.g., on board electronics, angle sensors, or the like, an electronics housing such as those described in U.S. patent application Ser. No. 12/857,793 can be used.

While sensor 100 has been described above in the exemplary context of a torque link assembly for a landing gear, those skilled in the art will readily appreciate that such sensors can be used in any other suitable applications without departing from the spirit and scope of the invention. For example, it is contemplated that a sensor assembly such as sensor 100 can be configured to monitor pure shear between any two mount bodies, such as in clevis or trunnion applications, to monitor overhanging loads on the main pin, and/or to monitor any other similar type of load.

The methods and systems of the present invention, as described above and shown in the drawings, provide for sensors for monitoring loads in landing gear torque links with superior properties including sensitivity and robustness under exposure to the elements and flying debris. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A sensor for monitoring loads in a landing gear torque linkage comprising:
    a) a main pin having an axial interior bore defined therein and having a length defined from a first end to an opposed second end thereof, wherein the main pin is configured and adapted to engage a torque link to a strut lug of a landing gear strut;
    b) a core pin mounted axially aligned within the interior bore of the main pin and being spaced radially inwardly with a radial clearance from the interior bore for relative displacement with respect to the main pin; and
    c) a capacitor having an inner capacitor plate mounted to the core pin, and a first outer capacitor plate mounted to the main pin, such that relative displacement of the core pin and the main pin due to external loading on the main pin results in relative displacement of the inner and first outer capacitor plates, wherein the capacitor is configured to be connected to an electrical circuit to produce a signal indicative of the loads acting on the torque link and strut lug based on changes in capacitance due to relative displacement of the inner and first outer capacitor plates;

d) a second outer capacitor plate mounted to the main pin, wherein the first outer capacitor plate and the second outer capacitor plate are semi-cylindrical and are aligned circumferentially and axially, wherein the second outer capacitor plate is configured to be connected to the electrical circuit to produce a signal indicative of an external loading on the main pin based on the relative displacement of the core pin and the main pin, and wherein the electrical circuit is configured to constructively combine the signal from the inner capacitor plate and the first outer capacitor plate and the signal from the inner capacitor plate and second outer capacitor plate.

2. A sensor as recited in claim 1, further comprising an angle sensor mounted in the axial interior bore of the main pin between the capacitor and the first end of the main pin.

3. A sensor as recited in claim 2, wherein the core pin, capacitor, and angle sensor are mounted proximate the first end of the main pin, and further comprising a second such core pin, capacitor, and angle sensor mounted proximate the second end of the main pin.

4. A torque linkage for bearing and monitoring rotational moments in a landing gear strut comprising:
a) a main pin engaging a torque link to a strut lug, wherein the torque link is configured and adapted to bear rotational moments about a lengthwise axis of the landing gear strut, and wherein the main pin has an axial interior bore defined therein and has a length defined from a first end to an opposed second end thereof;
b) a core pin mounted axially within the interior bore of the main pin and being spaced radially inwardly from the interior bore for relative displacement with respect to the main pin; and
c) a capacitor having an inner capacitor plate mounted to the core pin, and an outer capacitor plate mounted to the main pin, such that relative displacement of the core pin and the main pin due to loads acting on the torque link and strut lug results in relative displacement of the inner and outer capacitor plates, wherein the capacitor is configured and adapted to be connected to an electrical circuit to produce signals indicative of the loads acting on the torque link and strut lug based on the relative displacement of the inner and outer capacitor plates.

5. A torque linkage as recited in claim 4, wherein the interior bore extends along about half of the length of the main pin, wherein the core pin is cantilevered to the interior bore proximate a middle portion of the main pin, and wherein the capacitor is located proximate the second end of the main pin.

6. A torque linkage as recited in claim 4, wherein the capacitor includes a plurality of outer capacitor plates, each capacitor plate being mounted to the main pin and being aligned axially with the inner capacitor plate, and wherein the outer capacitor plates are configured and adapted to be connected to an electrical circuit to produce signals indicative of external loading on the main pin based on the relative displacement of the core pin and the main pin.

7. A torque linkage as recited in claim 6, wherein there are three or more outer capacitor plates configured and adapted to be connected to an electrical circuit to produce signals indicative of magnitude and orientation of external loading on the main pin based on the relative displacement of the core pin and the main pin.

8. A torque linkage as recited in claim 6, wherein the outer capacitor plates are spaced apart evenly circumferentially.

* * * * *